US008561189B2

(12) United States Patent
Goranson et al.

(10) Patent No.: US 8,561,189 B2
(45) Date of Patent: Oct. 15, 2013

(54) METHOD AND APPARATUS FOR DISTRIBUTED INTRUSION PROTECTION SYSTEM FOR ULTRA HIGH BANDWIDTH NETWORKS

(75) Inventors: Craig A. Goranson, Kennewick, WA (US); John R. Burnette, Kennewick, WA (US); Frank L. Greitzer, Richland, WA (US); Bryan H. McMillan, Kennewick, WA (US)

(73) Assignee: Battelle Memorial Institute, Richland, WA (US)

( * ) Notice: Subject to any disclaimer, the term of this patent is extended or adjusted under 35 U.S.C. 154(b) by 1184 days.

(21) Appl. No.: 11/473,634

(22) Filed: Jun. 23, 2006

(65) Prior Publication Data

US 2007/0300298 A1 Dec. 27, 2007

(51) Int. Cl.
*G06F 11/00* (2006.01)
*G06F 15/173* (2006.01)

(52) U.S. Cl.
USPC ............................. 726/23; 709/224

(58) Field of Classification Search
USPC ............ 726/11, 22, 23, 25, 30; 709/224, 238; 713/87, 88, 89
See application file for complete search history.

(56) References Cited

U.S. PATENT DOCUMENTS

| | | | |
|---|---|---|---|
| 6,279,113 B1* | 8/2001 | Vaidya | 726/23 |
| 6,304,975 B1* | 10/2001 | Shipley | 726/22 |
| 6,519,703 B1* | 2/2003 | Joyce | 726/22 |
| 6,535,227 B1* | 3/2003 | Fox et al. | 715/736 |
| 7,278,162 B2* | 10/2007 | Lingafelt et al. | 726/23 |
| 7,409,714 B2* | 8/2008 | Gupta et al. | 726/23 |
| 7,463,590 B2* | 12/2008 | Mualem et al. | 370/241 |
| 7,546,471 B2* | 6/2009 | Phillips et al. | 713/188 |
| 7,620,974 B2* | 11/2009 | Newstadt et al. | 726/1 |
| 7,739,739 B2* | 6/2010 | Dettinger et al. | 726/24 |
| 2002/0124104 A1* | 9/2002 | Rappaport et al. | 709/238 |
| 2003/0145226 A1* | 7/2003 | Bruton et al. | 713/201 |
| 2006/0210270 A1* | 9/2006 | Han et al. | 398/48 |
| 2006/0271677 A1* | 11/2006 | Mercier | 709/224 |
| 2007/0056037 A1* | 3/2007 | Focke et al. | 726/22 |
| 2007/0074272 A1* | 3/2007 | Watanabe | 726/3 |
| 2007/0204337 A1* | 8/2007 | Schnackenberg et al. | 726/11 |
| 2007/0209075 A1* | 9/2007 | Coffman | 726/23 |

* cited by examiner

*Primary Examiner* — Nathan Flynn
*Assistant Examiner* — Abdullah Almamun
(74) *Attorney, Agent, or Firm* — Klarquist Sparkman, LLP (57) ABSTRACT

A method for providing security to a network having a data stream with a plurality of portions of data, each having differing levels of sensitivity. The data stream is interrogated to determine the presence of predetermined characteristics associated with at least one of the portions of data within the data stream. At least one of the portions of data is then characterized, based upon the portion of data exhibiting a predetermined combination of characteristics, wherein the predetermined combination of characteristics is related to the sensitivity of the portion of data. The portions of the data stream are then distributed into a plurality of different channels, each of the channels associated with different level of sensitivity.

35 Claims, 2 Drawing Sheets

Figure 1

Figure 2 ially also the network providers. It will also be important to
METHOD AND APPARATUS FOR DISTRIBUTED INTRUSION PROTECTION SYSTEM FOR ULTRA HIGH BANDWIDTH NETWORKS The invention was made with Government support under Contract DE-AC0676RLO 1830, awarded by the U.S. Department of Energy. The Government has certain rights in the invention.

TECHNICAL FIELD

This invention relates to methods and apparatus for providing security to high speed networks. More specifically, this invention relates to methods and apparatus for distributed intrusion protection allowing security for ultra high bandwidth networks.

BACKGROUND OF THE INVENTION

The need for network security is pervasive in organizations ranging from large corporate, governmental, and educational institutions to small business and individuals. Pervasive and continuing attacks on large networks, and the considerable costs and damages such attacks can inflict, have provided incentive for researchers in government, industry, and academia to search for methods and apparatus to provide security for these networks.

For example, in U.S. Pat. No. 6,816,973 entitled "Method and system for adaptive network security using intelligent packet analysis" describes a method and system for adaptive network security using intelligent packet analysis by monitoring network data traffic. The network data traffic is analyzed to assess network information. A plurality of analysis tasks are prioritized based upon the network information, the analysis tasks are performed on the monitored network data traffic in order to identify attacks upon the network. The plurality of analysis tasks includes a plurality of comparisons between the monitored network data traffic and a plurality of attack signatures, and disables a particular attack signature based upon an assigned priority of the particular attack signature. This and all other papers, publications, patents, and other references are hereby incorporated into this disclosure in their entirety by this reference.

In U.S. Pat. No. 7,010,700, entitled "Data scanning network security technique" a data security apparatus for use in a computer network for checking data received from an external source is described. In this apparatus, a multiprotocol rule set data scanner capable of scanning the data received for acceptable content and format as determined by a rule set established by a recognized protocol is provided, such that the data is scanned in subdivisions set by the recognized protocol as the data is received. A data translator for translating the data is then provided, and a data network transmitter for transmitting the translated data to a destination node on the computer network. A mail connection detector is then utilized for detecting if an external source is attempting to establish a mail connection with the computer network wherein the computer network is receptive to one or more recognized protocols; and a data receiver is provided for receiving data from the external source.

The forgoing are merely two examples of methods and apparatus for network security in a technical field highly crowded with on going research and inventive activity. One of the key challenges experienced by those having skill in this art is related to innovative research at the frontiers of proteomics, genomics, and bioinformatics. The information associated with these fields has yielded tremendous challenges for the computational sciences to meet significantly elevated network connectivity requirements. Providing effective connectivity to instrumentation and computational resources for such research requires ultra high-speed networks that can sustain petabyte data rates, and relies on development of an integrated advanced infrastructure for performing distributed science. The nature of these networks raises a broad range of security concerns as threats to such networks range considerably. Ultra high-speed networks are likely to be attractive targets for intruders on many levels. As an example, illicit exploitation of ultra networks would aid attackers of any password-based infrastructure.

The Teracrack project at the San Diego Supercomputer serves as an illustration of the effectiveness of petabyte systems utilized as password cracking support. This project showed that it was possible to pre-compute hashes for 50 million passwords in 80 minutes or less, on a 6 petabyte computer as described in Perrine, T. and D. Kowatch. *Teracrack: Password cracking using teraFLOP and petabyte resources*. which may be accessed online at http://security.sdsc.edu/publications/teracrack.pdf.

Simple use of ultra high-speed networks is not the only possible goal of intruders or external attackers. Disruption of service, compromise of internal data, and interference with computation outcomes are all potential attacks which would adversely affect both those using such networks and potentially also the network providers. It will also be important to prevent attacks originating within a particular component of a high-speed network from affecting other resources, either those that are part of the network or those that are external to (but reachable from) it. Protecting the information security and operation of ultra high-speed networks is clearly crucial if their full value to the research community is to be realized.

Researchers have addressed several aspects of security and survivability for high speed networks. Examples include: file system protection through such projects as Legion, as described in White, B., M. Walker, M. Humphrey, A. Grimshaw. *LegionFS: a secure and scalable file system supporting cross-domain high-performance application*. Proceedings of the 2001 ACM/IEEE conference on Supercomputing, 2001, resource management and separation of secure authentication and communication and sharing resources "through" firewalls as described in Graupner, S. and C. Reimann. *Globus Grid and Firewalls: Issues and Solutions in a Utility Data Center Environment*. Technical Report HP Labs. HPL-2002-278. 2002. Multilayer survivability of protocols, such as IP/GMPLS and IP/WDM, have also been the subject of a great deal of research as described in Zhang, H. and A. Durresi. *Differentiated Multi-layer Survivability in IP/WDM Networks*. 8th IEEE-IFIP Network Operations and Management Symposium (NOMS 2002), pages 681-694 which may be accessed online at http://citeseer.nj.nec.com/zhang02differentiated.html and Vinodkrishnan, K., N. Chandhok, A. Durresi, R. Jain, R. Jagannathan, and S. Seetharaman, *Survivability in IP over WDM networks*, Journal of High Speed Networks, Vol. 10, No. 2, 2001, pp. 79-90.

Although areas are necessary aspects of security for high speed networks, they do not directly address the problem of the intruder who crosses boundaries. Past history suggests as a near certainty that ultra high-speed networks will be desirable targets for intruders, and that vulnerabilities in their design will be discovered and exploited. Therefore, there is a need to incorporate defensive, mitigating, and response methodologies in the early stages of ultra high speed computing network architecture development.

Early stages of network design have typically emphasized those areas of most value to the target user community, often focusing primarily on improvements in bandwidth and usability. From that perspective designers often consider security a desirable, but secondary, property. In particular, methodologies intended specifically to address intruders are rarely considered to any large extent during the early stages of design, with a few exceptions, such as those described in Lock/Sidewinder reference Badger, L., Sterne, D., Sherman, D., Walker, K. and Haghighat, S. *Domain and Type Enforcement UNIX Prototype*, Proceedings of the Fifth USENIX UNIX Security Symposium, June 1995. Consequently, security strategies for handling malicious activity that crosses network boundaries are normally realized as "add-on" mechanisms placed at a network's perimeter, such as traditional IDS sensors, firewalls, and other security devices. These are designed to augment the original structure, blocking, detecting, and sometimes responding to malicious activity. Because these mechanisms are not fully integrated, they cannot always be implemented or deployed optimally. The negative consequences include inconsistency of security management, reduced performance (both network speeds and efficiency of security), lag time of response, and difficulties in coordinating with other locales as in a cooperative defense architecture.

Performance is particularly an issue for high speed networks. As networking speed increases, with consequences in traffic volume and rate, the load on these external network protection devices also increases. Even now, perimeter defense devices currently have difficulty keeping up with the scrutiny needed for high volumes of traffic, particularly when CPU-intensive analytical techniques are used, and even when there are large numbers of relatively simple comparisons to be performed. An added difficulty comes in the modern proliferation of new attacks, and the increased tendency for rapid spread seen in modern viruses and worms. Technologically, those charged with protecting these systems are rapidly reaching a threshold in which external security devices cannot function effectively under current architecture models. The consequences of "missing" an incoming known attack, or lacking the capacity to identify a new form of attack, can have major consequences. It is more and more often the case that, if even a single instance of malicious code enters a network system, it can seriously affect the usability of the entire system. Thus, there is a need for a new class of network architecture and infrastructure to address the needs for high bandwidth and the needs to secure and control the corporate Intranet environment.

There are parallels to the issue of protecting cooperating components of an ultra high speed network, such as those proposed by the United States Department of Energy, and issues seen in the commercial networks. Products currently in use to protect network systems are based on traditional network models emphasize perimeter defense strategies, normally focusing upon analysis of data at the entry point of the high speed network connections. This is typically performed in a single, centralized location. This approach does not scale well to ultrahigh bandwidth and computing power, especially when the resources are distributed. Researchers are looking to cooperative systems and highly distributed defense systems for potential solutions. In the interim, field practitioners regularly segment their networks by using protection devices as barriers, for a variety of reasons including the increased capacity to limit spread of malicious code, and to better track, contain, and manage the insider threat.

In the interim, containment via firewall is a common strategy to slow or block the spread of malicious activity. The implied limitations of traffic between networks connected in this way are somewhat in opposition to the goals of ultra network development. This has led some researchers to devise methods for tunneling ultra network traffic through firewalls. Such approaches are useful for achieving connectivity. However, the effect of this is to remove the perimeter control points intended to prevent intrusions and DDOS and other boundary-crossing malicious activity. If existing perimeter defense methods are to be bypassed in order to connect resources, it is even more important to include equivalent functionality as part of the ultra network architecture itself.

The scientific, research and development literature identifies several challenges to the implementation of secure ultra high-speed network connectivity solutions. These may be divided into those that are broad issues with current network infrastructures that must be considered when devising security strategies, and those more specific to the activities of detecting, and responding to, breaches of security.

Broad issues for designing high speed security include

1. Existing network protocols that do not scale well to high bandwidth network connections, as described in *Survey of Protocols and Mechanisms for Enhanced Transport over LONG FAT PIPES* available online at http://www.ev-1.uic.edu/eric/atp/Survey.doc 2. New experimental high-speed protocols are not necessarily friendly to existing network protocols such as TCP & UDP as described in Jin, S., Guo, L., Matta, I., and Bestavros, A. *A Spectrum of TCP-friendly Window-based Congestion Control Algorithms*, Technical Report. BU-CS-2001-015, Computer Science Department, Boston University, July 2001, available online at http://citeseer.nj.nec.com/jin01spectrum.html 3. Current network infrastructure is not necessarily tuned to allow high-speed computing and routing of Intranet data connections as described in Tierney, B. TCP *Tuning Techniques for High-Speed Wide-Area Networks*, Presentation, Fall 02 and available online at http://bmrc.berkeley.edu/courseware/mig/fall02/tierney.pdf and http://www.doe-scicomp.info/presentations/blumenthal.pdf.

Broad issues for designing high speed security include detecting and responding to security breaches include, but are not limited to the following:

1. Data rates are quickly outpacing the capability of network security appliances to sensor and secure the network as described in RFC 3473. Generalized Multi-Protocol Label Switching (GMPLS) Signaling Resource ReserVation Protocol-Traffic Engineering (RSVP-TE) Extensions, available online at ftp://ftp.isi.edu/in-notes/rfc3473.txt 2. High Speed Network Infrastructures increase the need for mounting real time responses to network events.

3. Component resources are not centrally owned and policies for allowable activities—and allowable responses—may differ from site to site The last two challenges are especially pertinent to development of an efficient Intrusion Protection System (IPS). Potentially the latency introduced by an IPS could have a significant detrimental impact on the ability to transfer data efficiently to high speed network links.

Accordingly, there exists a need for new methods and apparatus for intrusion protection systems that can protect ultra high speed networks that overcomes the forgoing considerations.

SUMMARY OF THE INVENTION

Accordingly one object of the present invention is to provide a method for providing security to a network. Another object of the present invention is to provide a method for providing security to a network that is capable of locating and identifying malicious network traffic. Yet another object of the present invention is to provide security to a network capable of locating and identifying malicious network traffic in a manner that does not degrade data flow within the network to unacceptable levels. Yet another object of the present invention is to provide security to a network that does not degrade data flow to unacceptable levels in networks passing data at petabyte per second levels.

As used herein, the terms "traffic" and "data" are interchangeable. Sensitivity as used herein refers to the potential of any portion of the data to cause harm. Sensitivity is thus a function of the threat presented by a particular portion of the data, the vulnerability to the threat, and the mitigation measures in place to address the threat. Malicious traffic is herein defined as network traffic flows or network traffic events that are detrimental to the proper operation of the network or damaging to the entity using the network as a whole. This definition of malicious traffic should not be limited to traffic which was sent with the "intent" to cause harm, as the intention of the sender to generate malicious traffic doesn't necessarily effect the outcome of the malicious traffic. These types of traffic may include, but are not limited to, the following types of traffic associated with the following events or activities.

Violations of Established Company Policies: Some types of traffic aren't themselves damaging to the network as a whole but are damaging to productivity or the work environment and as such as deemed to be malicious by our definition. These types of things are usually defined by the corporate entity and could include things like online gambling, listening to streaming audio and video from not work related sources, or playing games online.

File Sharing and Peer to Peer Networking: While peer to peer networks and adhoc overlay networks can be argued to have some value in some situations, a majority of the software can cause security compromises on a network or expose a company to legal liability.

Viruses/Trojans/Infections: Tens if not hundreds of new strains of computer viruses are discovered, analyzed and disclosed by the companies that provide anti-virus software every day. The spread of these viruses, the damage they can cause, and the growing threat of information theft associated with these types of threats, make it the traffic associated with them their own type of malicious traffic. Traffic associated with the spread of virus includes, but is not limited to, specific types and characteristics of incoming and outgoing email, types of instant messaging traffic, massive failed authentication attempts to network resources, mass copying of files to multiple network resources.

System or Information System Compromises: Traffic associated with a system compromise can often be traced back to a virus or Trojan, but the compromised system traffic is different then the spread of the virus as it is usually concentrated around gaining entry to other system or the theft of data. By analyzing and profiling the system behaviors through monitoring the system dependencies and interactions on the network, it is possible to detect possible system compromises by changes in behavior of the system as well as changes in data flows associated with the system.

Brute Force Intrusion Attempts: Brute Force intrusion attempts include things like port scanning a network to determine the services provided on the network. Mining of data from DNS systems and other informational systems that can give more detail about systems on the network. As well as the brute force attack against network passwords and resources.

The "port scan" and brute force password attacks are the most well known brute force attacks, but the brute force attacks against informational systems that provide additional information about the network are also high risk and often go unnoticed.

Insider Threat: The insider threat is an individual or a system owned by an individual who intentionally engages in an activity or cause harm to the company or network. This threat can be a combination of any of the above threats and traffic but since it usually internal in nature it exhibits much different characteristics then the other threats when involving an external entity.

Incorrectly Configured Systems: A system that is incorrectly configured on the network can be just as damaging as a virus or other well known threat. A system that is misconfigured as a DHCP server on the network, for example, may keep the rest of the network segment from getting a new IP address. A system that is misconfigured with a wrong IP address can cause other properly configured systems to route traffic incorrectly. So a system misconfiguration can have a cascading effect on a network, and as such by this definition is considered malicious and harmful to the network.

These and other objects are accomplished by the present invention. The present invention achieves network security at the speeds found in high speed networks by providing an adaptive, hybrid, pervasive defense matrix, here after referred to as AHPDM. The AHPDM selectively segregates network traffic according to it risk characteristics into a plurality of channels, thereby allowing parallel processing of the data within the traffic, and segregation of highly suspect data from less highly suspect data, thereby allowing highly detailed examination of suspect data without sacrificing network operating speed.

The AHPDM of the present invention provides a system that examines a data stream on a network. The data stream is characterized as having a plurality of portions of data, where each of these portions have different levels of sensitivity. The examination thus determines the presence of predetermined characteristics associated with at least one of the portions of data within the data stream, and preferably all of the portions of data within the data stream, and characterizes each portion according to that portion's sensitivity.

The present invention further characterizes at least one of the portions of data, and preferably characterizes all of the portions of data, based upon each portion of data exhibiting a predetermined combination of characteristics related to the level of sensitivity for that portion of the data. The specific predetermined combination of characteristics is related to the sensitivity of the portion of data being characterized. These combinations of characteristics may be determined statically, dynamically, or as a combination of statically and dynamically determined characteristics.

Dynamically constructed combinations of characteristics are preferably created based on feedback about portions of data with the same characterized sensitivity generated downstream of the channels. The dynamic determination of combinations of the characteristics thus includes self learning systems. Feedback may be provided sources including, but not limited to, sensors, external data feeds, changes in risk tolerance, and combinations thereof.

All basic characteristics used to characterize data and thus direct it to specific channels or pipes in the system are based on developing, assigning, and maintaining dynamic levels of trust for systems. This trust and the sensitivity of the conversation itself leads to the specific assigning and routing of traffic through a specific pipe. Characteristics that may be used include, but are not limited to, trusted source, trusted destination, protocol type, conversation behavior, system history, data flow sensitivity, and value of data flow, and combinations thereof. An explanation of each of these characteristics follows.

Trusted Source/Destination: There are a number of characteristics of a specific piece of traffic that could be used to classify as piece of communication as being from a trusted source. These include, but are not limited to, the following, either alone or in combination: Source IP Address, Specific Data Link Source (a dedicated link to site X), Destination IP Address, Source Mac Address, Signed or Encrypted Authenticated headers Protocol Type: Specific protocol types may be deemed to have specific levels of trust as different protocols have different levels of risks. These protocols may be combined with the trusted source/destination characteristics described above. For example, "Protocol A" sending traffic to system X might be trusted but "Protocol B" sending traffic to system X might not.

Behavior of Conversation: Trust cannot be absolute as systems can be compromised. As such, a level of belief based on systems behavior could possibly change the level of trust associated with a system or protocol and system depending on the behavior of that system as a whole on the network. By way of example, and not limitation, determining the system behavior could come from detections from IDS systems.

Past History of System: How long a system has been trusted with out an incident can be used to affect the level of scrutiny required on that system's traffic. While any system can be compromised, a system or traffic flow that has been safe and trusted for a long period of time would have a higher level of trust associated with it.

Sensitivity of Data Flow: Different types of data and data flows will typically have different levels of sensitivity and different security concerns. For example, and not meant to be limiting, one data flow might be considered business sensitive and as such would be tagged as such and routed through a secure fiber optic channel, as opposed to be routed through a wireless connection.

Value of Data Flow: While very similar, sensitivity of data and value of the data are distinct characteristics. A piece of data might have high value but little sensitivity. High value data is a high priority piece of information that must be delivered in a timely matter. The value of a data flow could lead to data being routed through a high speed pipe and given higher priority on delivery to the destination. By way of example, and not meant to be limiting, such high value data could be medical information in a hospital that is critical for a patient in surgery or other information that has a critical outcome if not delivered in a timely manner.

The present invention further distributes each of the portions of the data stream into a plurality of different channels, where each of the channels are associated with different levels of sensitivity. "Channels" as used herein means a pathway for the transport of data, whether physical or logical. Accordingly, examples of "channels" as the term is used herein would include, but not be limited to, 1) optical data transmission systems, 2) ethernet, and 3) wireless. "Different" channels, as the term is used herein, include, but are not limited to, 1) different wavelengths of light in an optical data transmission system, and different tags on packets transported on an Ethernet or wireless connection. In this manner, the present invention allows for massively parallel interrogation of the data, and allows for interrogation protocols to be varied across different channels, thereby providing highly invasive interrogation protocols for highly suspect data, and relatively less invasive interrogation protocols for trusted data. In this manner, the present invention is able to provide high levels of security without unacceptable penalties applied to the rate of data flow through the network.

One of the channels is a preferably a quarantine channel, which segregates suspect data from the network, thereby preventing such data from malicious behavior. In a preferred embodiment of the present invention, the channels are different wavelengths of light in an optical transmission medium. The channels are defined by tags attached to the portions of said data. Tags are selected from the group 802.1 VLAN, GMPLS, MPLS, light tags, data tags, overall level of trust tags, protocol tags, sensitivity tags, data value tags, component specific tags, and combinations thereof.

In a normal network routing, tags on packets explicitly declare what the recommended next hop will be on the network. In the AHPDM, tags on the packet include the intended destination for the traffic, but additionally include tags that classify the traffic contained in the packet. These tags are analyzed by each hop of the AHPDM system to determine the best method of delivery as well as the level of scrutiny that needs to be applied to the traffic.

Accordingly, 802.1 VLAN, Generalized Multi-protocol Label Switching (GMPLS)(also referred to as multiprotocol lambda switching), and Multi-protocol Label Switching (MPLS) should be given their customary meanings within the IEEE (Institute of Electrical and Electronics Engineers, Inc.) and the IEC (International Engineering Consortium), and no further explanation is necessary to enable those having ordinary skill in the art having the benefit of this disclosure to make and use the present invention. The remaining tags are described below Light Tags: The most basic tag would be identify the routing of traffic at a very high level. The light tag primarily determines the next hop in the routing of the traffic and may be assigned to the traffic by the previous hop. For example, and not meant to be limiting, traffic that is determined to be a high sensitivity and needed to be routed to system R from Y, is given a Red Lambda and put on the fiber from R to Y. While a data conversation that had a low sensitivity is given a Green Lambda and put on the fiber from R to Y.

Data Tags: Data tags contain lower level information that does contains details about why the traffic was classified a specific way, as well as more information on the classification of the traffic itself. These tags may be put in front of the normal-packet data stream and interpreted by the routing system. The tags would thus are conceptually like layers of an onion. The present invention thus characterizes the data by wrapping the data payload in a specific set of data tags, to help facilitate the correct delivery of the data between two points. At the opposite end of the connection, the present invention may unwrap the data tags from the data once it has transversed the pipe. By the nature of the system, the data tags will closely mirror the characteristics used to classify the flow as the data tags describe the conclusions made by the characteristics.

Tags may further be defined as being part of specific types or among groups of tags. This is to facilitate the extension of the tagging system in a dynamic network environment. A system that encounters a tag that is from a specific group (such as in the sensitivity group) would by default handle the traffic with the highest sensitivity rating it has. In this way an unknown or new tag implementation would not create errors within an existing network infrastructure deployment, but would instead cause the system to fall back to the most secure configuration.

Overall Level of Trust: A tag for a variable belief may be assigned to the data flow. For example, and not meant to be limiting, the level of trust might start out high, but after data passes intrusion detection system (IDS) system, the IDS system might retag the traffic's overall trust level as being low based on observed characteristics of the data that identify the data as suspect. Data identified as low trust might cause the retagging of the traffic to have it route past more IDS sensors for additional analysis before it moves to the destination, while highly trusted data might move directly to the destination.

Protocol: Data is generally associated with some type of higher level protocol (HTTP, SMTP, etc.) Once a network sensor or IDS has identified the specific protocol in use by analyzing the session, a tag may be added to the packet to allow additional system in the AHPDM to handle traffic accordingly. For example, and not meant to be limiting, an IDS might detect "Brand X" instant messaging in use on a data stream, and tag that protocols use to the data stream. Later, a policy enforcement component may detect that tag, and determines that using "Brand X" IM is against policy and thus drop the traffic. Since multiple layers of protocols are typical, such as HTTP running on top of TCP, which is on top of IP, the present invention could potentially have multiple protocol tags per packet.

Sensitivity: The sensitivity tag is used to allow an end point system to tag data at a specific sensitivity level prior to sending out data. The sensitivity tag would be an "at least" recommendation where the data is handled with at least as high as initially tagged. The sensitivity tag may be updated or modified by any component in the AHDPM to increase the level of sensitivity, if a rule set determines that based on one of the characteristics of the data that the sensitivity was tagged to low.

Value/Priority of Data: A tag may be assigned by either an end point system or the entry point to the AHDPM to the data to assign a priority of delivery for the data based on the value and urgency of the data. This tag would help determine recommendations to the rest of the system on how the data should be routed and whether it should be given priority handling.

Component Specific Tags: A large range of component specific tags may be used only between specific components of the AHPDM. For example, and not meant to be limiting, if data is flowing from an IDS sensor to a policy enforcement sensor there would be the above defined tags, but also tags specific to the conclusion of the IDS sensor, such as an event ID number that would allow the policy engine to correlate the IDS's conclusion to an event the IDS system logged.

The present invention may comprise, for example, software code executing on a computing device such as a SUN or INTEL based workstation. Alternatively, the present invention may comprise software code or firmware executed on one or more appliances interfaced with a network. "Appliances" as used herein include, but are not limited to, routers, switches, and computers. Accordingly, the present invention includes the steps of the present invention recorded in digital form on any media capable of storing an instruction set, and the execution of those steps in any computing device or group of computing devices capable of executing a digital instruction set. Media should be understood to include memory, whether static, dynamic, internal or external, and optical, magnetic, and mechanical storage devices, including, without limitation, cds, dvds, floppy disks, and punch cards.

As will be recognized by those having skill in the art, the function of any computer programmed by software to perform any series of steps, including the steps of the present invention, can be also be accomplished by configuring computer hardware to perform the identical steps. Further, a computer capable of multiple configurations can be designated as a single purpose computer, dedicated to performing only one task, simply by providing the computer only one software application. Accordingly, the present invention should also be understood to include any computer system, whether multi-purpose or single purpose, that has been configured to perform the steps described herein, whether as a series of steps provided to the computer as software, or by configuring the computer's hardware to perform the series of steps described and claimed herein.

BRIEF DESCRIPTION OF THE DRAWINGS

The following detailed description of the embodiments of the invention will be more readily understood when taken in conjunction with the following drawings, wherein.

DETAILED DESCRIPTION OF THE PREFERRED EMBODIMENTS

Figure 1:
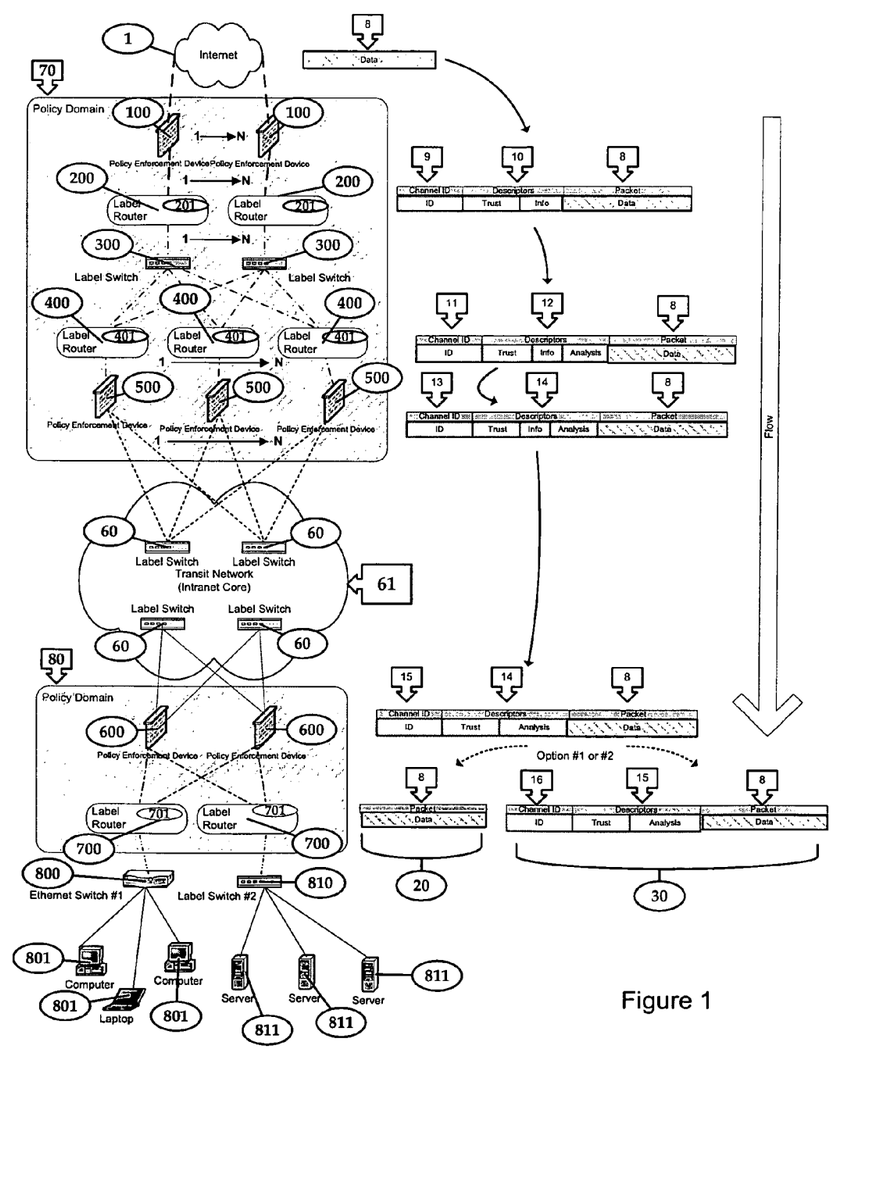
FIG. 1 is a schematic diagram of one embodiment of the present invention.

For the purposes of promoting an understanding of the principles of the invention, a schematic diagram of the AHPDM system of the present invention is shown in FIG. 1. In the description of FIG. 1, which follows, the following terms are defined below.

As used here in, the term "Descriptor Tags" refers to data which describes traffic characteristics, contains information observed or learned about source and destination of traffic, contains information observed or learned about content of traffic, and combinations thereof.

As used here in, the term "Channel Tags" refers to data that contains routing information on traffic flow, identifies desired channel and combinations thereof. "Channel Tags" may be encoded as a binary tag at front of packet or as a specific radio frequency or lambda of light.

As used here in, the term "Label Switch" refers to a hardware or software device which acts on Channel Tags to direct traffic to a given Channel, load balances traffic to different channels of the same type, adds or removes channel tags, and combinations thereof. In a preferred embodiment, and not meant to be limiting, "Label Switches" typically will not add or remove descriptor tags and/or modify traffic. Label switches can be selected as optical cross connects, copper switches, component modules, software and combinations thereof.

As used here in, the term "Label Router" refers to a hardware or software device which may integrate with internal and external information sources to characterize data and/or use data analysis or characterization tools and which may add, remove, and/or modify descriptor and channel tags on data packages. In a preferred embodiment, and not meant to be limiting, "Label Routers" typically will not block, restrict or drop packets or balance loads on the network.

As used here in, the term "Policy Enforcement Device" refers to a hardware or software device which blocks, restricts, directs and shapes traffic flows by applying policy to channel tags and descriptor tags. As such, "Policy Enforcement Devices" may change channel tags. In a preferred embodiment, and not meant to be limiting, "Policy Enforcement Devices" typically will not block, restrict or drop packets, balance loads on the network, or modify, add or remove Descriptor tags.

As shown in the Figure, traffic from the internet 1 first encounters policy enforcement devices 100. These policy enforcement devices 100 interrogate the data stream on the network to determine the presence of predetermined characteristics associated with the sensitivity of each of the portions of data within the data stream. The policy enforcement devices 100 are the outer edge of a border policy domain 70 in which policies are enforced for traffic entering the intranet 61 from the Internet 1.

Policy enforcement devices 100 may then either quarantine the data, discard the data, or route the data to one or more label edge routers 200. Label routers 200 include system analysis tools 201, which may be integrated intrusion detection systems (IDS), statistical analysis tools or combinations there of. System analysis tools 201 characterize at least one of the portions of data, based upon the portion of data exhibiting a predetermined combination of characteristics, wherein a predetermined combination of characteristics is related to the sensitivity of the portion of data.

Figure 2:
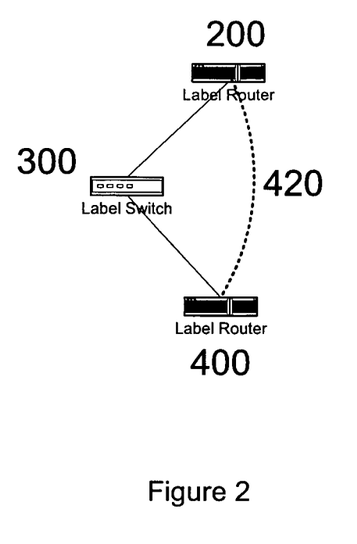
FIG. 2 is a schematic diagram which illustrates the control channels.

Data is then passed from the label edge routers 200 to one or more label switches 300. The label switches direct the traffic based on the tags applied by the label routers 200. If additional analysis has been deemed necessary by the label routers 200 then the label switches 300 send the data to one or more additional label routers 400 that may apply additional analysis if required or pass data through without modification to tags. Additional analysis is done through the use of either internally integrated or externally integrated data analysis tools 401, which may be but not necessarily the same as system analysis tools 201. As shown in FIG. 2, in addition to passing data, label routers 200 are connected to label routers 400 by control channels 420, which allows exchange of control information between label routers 200 and label routers 400, thus enabling dynamic generation of characteristic combinations within both label routers 200 and label routers 400.

Data is then passed by label routers 400 to policy enforcement devices 500 in a plurality of different channels, wherein each of the channels is associated with different levels of sensitivity. Policy enforcement devices 500 may then either quarantine the data, discard the data, or route the data out of the policy domain 70 to the intranet core 61. The policy enforcement devices 500 determine if the data is allowed to enter the Intranet core 61 based on the information supplied by the label routers 400 and 200.

Label switches 60 inside the Intranet core 61 interprets the tags and channels of the network traffic and, based on this interpretation, sends the network traffic either to the Internet policy domain 70 or the computer systems policy domain 80.

Policy Enforcement devices 600 in the computer systems policy domain 80 interpret the tags and channels associated with the data flows and, based on the policy for the policy domain, determines if the network traffic is allowed from the intranet core 61.

Policy enforcement devices 600 either allow or deny the traffic from the label switches 60. If allowed the data is sent to label routers 700. If not allowed by the policy enforcement devices 600, the traffic is either dropped or quarantined. Label routers 700 may apply additional analysis on the data flows through the use of security analysis tools 701 before passing traffic out of the computer system policy domain 80 to traditional network switches. Security analysis tools 701 may be the same as but not necessarily the same as data analysis tools 401 and/or system analysis tools 201.

If Label router 700 is attached to a traditional ethernet switch 800 it will strip all tags or channel information that had been previously applied to network traffic and send traffic to the traditional Ethernet switch 800. The Ethernet switch 800 then directs the traffic accordingly to computer systems 801.

If traffic is destined for label aware equipment, label router 700 sends it traffic to label switch 810. Label Switch 810 directs the traffic to label aware computer systems 811 that are capable of interpreting the labels and tags that had been applied by label routers 200, 400, and 700.

Computer systems 811 then may apply their own individual policies based on the analysis and information that has been provided in the form of tags, labels or channel information.

Continuing with FIG. 1, the data labeling that is applied to the network traffic is shown on the right hand side of the figure. Each step corresponds to operations shown to the left as previously described above.

As shown in FIG. 1, the traffic received from the internet is contained in a data package 8. If data package 8 does not internally contain any descriptors 10 it is passed to the Label routers 200 for analysis and labeling. As data passed through label routers the data package 8 is given an additional tags, channel id tags 9 and descriptor tags 10. Initially descriptor tags 10 may include trust level and information about the data package.

Label edge routers 200 add a descriptor based on enforcement of policy for policy domain 70. These descriptors 10 indicate the sensitivity of that data package. Based on the analysis, the label router applies a channel ID 11 to the data package. This channel ID 11 may be a digital tag that represents a channel number which result in the traffic being routed in the form of a different wave length or a specific physical channel of a physical medium.

The label switches 300 interpret the channel ID tags and direct the data packet to additional label routers 400 if necessary or to the policy enforcement device 500. If additional analysis is required then label router 400 may modify the channel ID 11 and descriptors 12 to reflect the outcome of its analysis. As such as descriptors 12 typically will contain the same information as descriptors 10 except descriptors 12 will have tags encoding the additional analysis.

The traffic is then sent to policy enforcement devices 500 which then enforce policies based on descriptors 12 and channel id 11. Based on the enforcement of policy it may reassign a new channel ID 13 and add additional information about its enforcement of the policy by modification of the descriptors 14. As such as descriptors 14 typically will contain the same information as descriptors 10 and/or descriptors 12, except descriptors 14 will have tags encoding the additional analysis.

Data is directed through the internet core 61 by the label switches 60 based on the channel ID 13. Policy enforcement devices 600 receive the traffic and apply the policy from policy domain 80 to the traffic based on their interpretation of the channel ID 13 and the descriptors 14. Based on their interpretation policy enforcement devices 600 will modify the channel ID 15 and the descriptors 14 before sending the data to the label routers 700.

Label routers 700 will determine if they the destination of the data is label aware or only data package aware. If the data destination is a non-label aware computer system 801 then it will remove channel ID 15 and descriptors 14 before it sends the packet 20 to the network switch 800.

If Label routers 700 determine that they data is destined to a label aware device or computer system 811 then they may modify channel ID 15 to and descriptors 14 to reflect any additional analysis before sending packet 30 to the label switch 810. Label switch 810 interprets the channel ID 15 and sends the data to the correct label aware system 811.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. A method, comprising:
examining a data stream on a network, the data stream comprising a plurality of portions of data, to determine the presence of one or more predetermined characteristics associated with at least one of the portions of data;
characterizing at least one of the portions of data based upon the at least one of the portions of data exhibiting a predetermined combination of the predetermined characteristics, the predetermined combination of the predetermined characteristics being related to the level of sensitivity of the at least one of the portions of data; and
distributing the portions of the data stream into a plurality of different channels based on the characterizing, selection of said channels in which to distribute the portions of the data stream being determined by tags attached to at least one of the portions of data, the tags including at least one or more of the following: 802.1 VLAN, GMPLS, MPLS, light tags, data tags, overall level of trust tags, protocol tags, sensitivity tags, data value tags, or component specific tags.

2. The method of claim 1 wherein the combination of characteristics is determined statically.

3. The method of claim 1 wherein the combination is dynamically constructed based on feedback about the portions of data generated downstream of the channels.

4. The method of claim 3 wherein the dynamic construction of the combination of characteristics includes self learning systems.

5. The method of claim 3 wherein the feedback is provided by at least one or more of the following: sensors, external data feeds, or changes in risk tolerance.

6. The method of claim 1 wherein one of the plurality of channels is a quarantine channel.

7. The method of claim 1 wherein said channels are different wavelengths of light in an optical transmission medium.

8. The method of claim 1 wherein the method is performed using at least one appliance interfaced with the network.

9. The method of claim 1 wherein the characteristics include at least one or more of the following: trusted source, trusted destination, protocol type, conversation behavior, system history, data flow sensitivity, or value of data flow.

10. One or more computer-readable storage media encoded with digital instructions for providing security to a network, the instructions comprising:
instructions for interrogating a data stream on said network, the data stream including a plurality of portions of data, to determine the presence of one or more predetermined characteristics associated with at least one of the portions of data within the data stream;
instructions for characterizing at least one of the portions of data based upon the at least one of the portions of data exhibiting a predetermined combination of the predetermined characteristics, and, based on the characterizing, adding, removing, and/or modifying one or more tags on a data package comprising at least one of the portions of the data, the tags including at least one or more of the following: 802.1 VLAN, GMPLS, MPLS, light tags, data tags, overall level of trust tags, protocol tags, sensitivity tags, data value tags, or component specific tags; and
instructions for distributing the portions of the data stream into a plurality of different channels based on at least one of the tags.

11. The media of claim 10 wherein the combination of characteristics is determined statically.

12. The media of claim 10 wherein the combination is dynamically constructed based on feedback about portions of data generated downstream of the channels.

13. The media of claim 12 wherein the dynamic construction of the combination of characteristics includes self learning systems.

14. The media of claim 13 wherein the feedback is provided by at least one or more of the following: sensors, external data feeds, or changes in risk tolerance.

15. The media of claim 10 wherein one of the plurality of channels is a quarantine channel.

16. The media of claim 10 wherein said channels are different wavelengths of light in an optical transmission medium.

17. The media of claim 10 wherein the method is performed using at least one appliance interfaced with the network.

18. The media of claim 10 wherein the characteristics include at least one or more of the following: trusted source, trusted destination, protocol type, conversation behavior, system history, data flow sensitivity, or value of data flow.

19. An appliance configured to provide security to a network comprising:
a memory or storage device storing instructions that when executed by the appliance cause the appliance to perform a method, the method comprising:
interrogating a data stream on said network to determine the presence of one or more predetermined characteristics associated with one or more portions of data within the data stream,
characterizing at least one of the portions of data, based on a predetermined combination of the predetermined characteristics, the predetermined combination being related to the sensitivity of one or more of the portions of data,
based on the characterizing, attaching one or more tags to at least one data packages, the tags including at least one or more of the following: 802.1 VLAN, GMPLS, MPLS, light tags, data tags, overall level of trust tags, protocol tags, sensitivity tags, data value tags, or component specific tags, and
distributing the at least one data package into a selected channel of a plurality of different channels, the selected channel defined by the attached tags.

20. The appliance of claim 19 wherein the combination of characteristics is determined statically.

21. The appliance of claim 19 wherein the combination is dynamically constructed based on feedback about portions of data generated downstream of the channels.

22. The appliance of claim 21 wherein the dynamic construction of the combination of characteristics includes self learning systems.

23. The appliance claim 22 wherein the feedback is provided by at least one or more of the following: sensors, external data feeds, or changes in risk tolerance.

24. The appliance of claim 19 wherein one of the plurality of channels is a quarantine channel.

25. The appliance of claim 19 wherein said channels are different wavelengths of light in an optical transmission medium.

26. The appliance of claim 19 wherein the appliance is interfaced with the network.

27. The appliance of claim 19 wherein the characteristics include at least one or more of the following: trusted source, trusted destination, protocol type, conversation behavior, system history, data flow sensitivity, or value of data flow.

28. An appliance configured to provide security to a network comprising:
- a memory or storage device storing instructions that when executed by the appliance cause the appliance to perform a method, the method comprising:
  - interrogating a data stream on said network to determine the presence of one or more predetermined characteristics associated with one or more portions of data within the data stream,
  - characterizing at least one of the portions of data, based on a predetermined combination of the predetermined characteristics, the predetermined combination being related to the sensitivity of one or more of the portions of data, and
  - distributing the portions of the data stream into a plurality of different channels based on the characterizing, wherein said plurality of channels are different wavelengths of light in an optical transmission medium.

29. The appliance of claim 28 wherein the combination of characteristics is determined dynamically.

30. The appliance of claim 29 wherein the combination is dynamically constructed based on feedback about portions of data generated downstream of the channels.

31. The appliance of claim 30 wherein the dynamic construction of the combination of characteristics includes self learning systems.

32. The appliance claim 31 wherein the feedback is provided by at least one or more of the following: sensors, external data feeds, or changes in risk tolerance.

33. The appliance of claim 28 wherein one of the plurality of channels is a quarantine channel.

34. The appliance of claim 28 wherein the appliance is interfaced with the network.

35. The appliance of claim 28 wherein the characteristics include at least one or more of the following: trusted source, trusted destination, protocol type, conversation behavior, system history, data flow sensitivity, or value of data flow.

* * * * *

UNITED STATES PATENT AND TRADEMARK OFFICE
CERTIFICATE OF CORRECTION

| | | |
|---|---|---|
| PATENT NO. | : 8,561,189 B2 | Page 1 of 1 |
| APPLICATION NO. | : 11/473634 | |
| DATED | : October 15, 2013 | |
| INVENTOR(S) | : Craig A. Goranson et al. | |

It is certified that error appears in the above-identified patent and that said Letters Patent is hereby corrected as shown below:

In the Claims

Column 14, Claim 19
Line 47, "packages" should be --package--

Column 16, Claim 32
Line 13, "appliance claim" should be --appliance of claim--

Signed and Sealed this
Thirty-first Day of March, 2015

Michelle K. Lee
*Director of the United States Patent and Trademark Office*